United States Patent
DeHaan

(10) Patent No.: US 9,477,570 B2
(45) Date of Patent: Oct. 25, 2016

(54) MONITORING SOFTWARE PROVISIONING

(75) Inventor: Michael Paul DeHaan, Morrisville, NC (US)

(73) Assignee: Red Hat, Inc., Raleigh, NC (US)

( * ) Notice: Subject to any disclaimer, the term of this patent is extended or adjusted under 35 U.S.C. 154(b) by 1288 days.

(21) Appl. No.: 12/198,378

(22) Filed: Aug. 26, 2008

(65) Prior Publication Data

US 2010/0058307 A1    Mar. 4, 2010

(51) Int. Cl.
  G06F 9/44   (2006.01)
  G06F 9/45   (2006.01)
  G06F 9/445  (2006.01)
  G06F 11/30  (2006.01)

(52) U.S. Cl.
  CPC ......... G06F 11/3055 (2013.01); G06F 11/302 (2013.01); G06F 11/3051 (2013.01); G06F 11/3058 (2013.01); G06F 11/3065 (2013.01)

(58) Field of Classification Search
  CPC ........ G05F 8/65; G05F 11/3466; G06F 8/67; G06F 8/68; G06F 11/3409; G06F 11/3051; G06F 11/3003; G06F 11/3055; G06F 11/302; G06F 11/3058; G06F 11/3065
  USPC .......................................... 717/717, 168–178
  See application file for complete search history.

(56) References Cited

U.S. PATENT DOCUMENTS

| | | | |
|---|---|---|---|
| 5,787,246 A | 7/1998 | Lichtman et al. | |
| 5,835,719 A | 11/1998 | Gibson et al. | |
| 5,948,062 A | 9/1999 | Tzelnic et al. | |
| 6,105,100 A | 8/2000 | Dean et al. | |
| 6,212,585 B1 | 4/2001 | Chrabaszcz | |
| 6,243,747 B1 | 6/2001 | Lewis et al. | |
| 6,272,536 B1 | 8/2001 | van Hoff et al. | |
| 6,381,742 B2 | 4/2002 | Forbes et al. | |
| 6,397,244 B1 * | 5/2002 | Morimoto et al. | 709/200 |
| 6,415,289 B1 | 7/2002 | Williams et al. | |
| 6,438,711 B2 | 8/2002 | Woodruff | |
| 6,516,427 B1 | 2/2003 | Keyes et al. | |
| 6,526,442 B1 | 2/2003 | Stupek et al. | |
| 6,550,021 B1 | 4/2003 | Dalphy et al. | |
| 6,557,169 B1 | 4/2003 | Erpeldinger | |
| 6,594,664 B1 | 7/2003 | Estrada et al. | |
| 6,625,742 B1 | 9/2003 | Owhadi et al. | |

(Continued)

FOREIGN PATENT DOCUMENTS

RU    WO 2009058042 A1 *   5/2009    .......... G06F 11/3466

OTHER PUBLICATIONS

Akhil Sahai Felix Wu, Utility Computing, 2004, pp. 15-25.*

(Continued)

*Primary Examiner* — Thuy Dao
*Assistant Examiner* — Mongbao Nguyen
(74) *Attorney, Agent, or Firm* — Lowenstein Sandler LLP

(57) ABSTRACT

A provisioning server can actively monitor the software provisioning processes being performed on a target machine to determine the status and integrity of the provisioning processes and notify an administrator or user of the status and integrity. The provisioning server can be configured to include a monitoring module and a message module. The monitoring module can be configured to monitor software provisioning processes being performed on a target machine and determine the status and integrity of the provisioning processes. The message module can be configured send notification to the administrator or user of the status and integrity of the provisioning processes.

12 Claims, 4 Drawing Sheets

(56) References Cited

U.S. PATENT DOCUMENTS

| | | |
|---|---|---|
| 6,686,838 B1 | 2/2004 | Rezvani et al. |
| 6,751,659 B1 | 6/2004 | Fenger et al. |
| 6,757,837 B1 | 6/2004 | Platt et al. |
| 6,769,022 B1 | 7/2004 | DeKoning et al. |
| 6,779,004 B1 | 8/2004 | Zintel |
| 6,792,460 B2* | 9/2004 | Oulu et al. .................. 709/224 |
| 6,802,054 B2* | 10/2004 | Faraj ............................ 717/128 |
| 6,845,464 B2 | 1/2005 | Gold |
| 6,865,737 B1 | 3/2005 | Lucas et al. |
| 6,915,278 B1 | 7/2005 | Ferrante et al. |
| 6,947,939 B2 | 9/2005 | Fujibayashi et al. |
| 6,986,033 B2 | 1/2006 | Miyamoto et al. |
| 7,013,461 B2 | 3/2006 | Hellerstein et al. |
| 7,051,101 B1 | 5/2006 | Dubrovsky et al. |
| 7,107,330 B1 | 9/2006 | Hamilton et al. |
| 7,133,822 B1 | 11/2006 | Jacobson |
| 7,165,109 B2 | 1/2007 | Chiloyan et al. |
| 7,185,071 B2 | 2/2007 | Berg et al. |
| 7,200,845 B2 | 4/2007 | Morrison et al. |
| 7,260,818 B1 | 8/2007 | Iterum et al. |
| 7,340,637 B2 | 3/2008 | Nagoya |
| 7,350,112 B2 | 3/2008 | Fox et al. |
| 7,356,679 B1 | 4/2008 | Le et al. |
| 7,395,322 B2 | 7/2008 | Harvey et al. |
| 7,487,494 B2 | 2/2009 | Chan et al. |
| 7,506,040 B1 | 3/2009 | Rabe et al. |
| 7,506,151 B2 | 3/2009 | Miyamoto et al. |
| 7,509,416 B1 | 3/2009 | Edwardson et al. |
| 7,516,218 B2 | 4/2009 | Besson |
| 7,519,691 B2 | 4/2009 | Nichols et al. |
| 7,574,481 B2 | 8/2009 | Moore et al. |
| 7,577,722 B1* | 8/2009 | Khandekar et al. .......... 709/220 |
| 7,600,005 B2 | 10/2009 | Jamkhedkar et al. |
| 7,606,868 B1 | 10/2009 | Le et al. |
| 7,631,168 B1* | 12/2009 | Muellers ............... G06F 11/302 712/220 |
| 7,640,325 B1 | 12/2009 | DeKoning et al. |
| 7,681,080 B2 | 3/2010 | Abali et al. |
| 7,716,316 B2 | 5/2010 | Nichols et al. |
| 7,734,717 B2 | 6/2010 | Saarimaki et al. |
| 7,747,730 B1 | 6/2010 | Harlow |
| 7,818,721 B2* | 10/2010 | Sundararajan et al. ...... 717/130 |
| 7,827,261 B1 | 11/2010 | Griswold et al. |
| 7,831,997 B2 | 11/2010 | Eldar et al. |
| 7,873,878 B2* | 1/2011 | Belluomini et al. ............ 714/52 |
| 7,891,012 B1 | 2/2011 | Kiel et al. |
| 7,937,437 B2 | 5/2011 | Fujii |
| 7,945,897 B1 | 5/2011 | Cook |
| 7,996,648 B2 | 8/2011 | England et al. |
| 8,065,676 B1* | 11/2011 | Sahai et al. ........................ 718/1 |
| 8,074,201 B2 | 12/2011 | Ghercioiu et al. |
| 8,141,090 B1* | 3/2012 | Graupner et al. ............. 718/104 |
| 8,171,485 B2* | 5/2012 | Muller .......................... 718/104 |
| 8,181,174 B2 | 5/2012 | Liu |
| 8,230,059 B1* | 7/2012 | Santos et al. .................. 709/224 |
| 8,255,650 B1 | 8/2012 | Gruttadauria et al. |
| 8,949,426 B2 | 2/2015 | Morgan |
| 2002/0029326 A1 | 3/2002 | Reuter et al. |
| 2002/0035604 A1 | 3/2002 | Cohen et al. |
| 2002/0062259 A1 | 5/2002 | Katz et al. |
| 2002/0069213 A1 | 6/2002 | Moslander et al. |
| 2002/0078186 A1 | 6/2002 | Engel et al. |
| 2002/0086688 A1 | 7/2002 | Kang |
| 2002/0112171 A1 | 8/2002 | Ginter et al. |
| 2002/0138567 A1 | 9/2002 | Ogawa |
| 2002/0162028 A1 | 10/2002 | Kennedy |
| 2003/0005097 A1 | 1/2003 | Barnard et al. |
| 2003/0055919 A1 | 3/2003 | Fong et al. |
| 2003/0069884 A1 | 4/2003 | Nair et al. |
| 2003/0069946 A1 | 4/2003 | Nair et al. |
| 2003/0070110 A1 | 4/2003 | Aija et al. |
| 2003/0074549 A1 | 4/2003 | Paul et al. |
| 2003/0097422 A1* | 5/2003 | Richards et al. .............. 709/217 |
| 2003/0110173 A1 | 6/2003 | Marsland |
| 2003/0110248 A1* | 6/2003 | Ritche ............................ 709/224 |
| 2003/0119480 A1 | 6/2003 | Mohammed |
| 2003/0126585 A1 | 7/2003 | Parry |
| 2003/0160823 A1 | 8/2003 | Stannard |
| 2003/0195921 A1 | 10/2003 | Becker et al. |
| 2003/0212992 A1 | 11/2003 | Ronning et al. |
| 2003/0220835 A1 | 11/2003 | Barnes, Jr. |
| 2004/0006616 A1 | 1/2004 | Quinn et al. |
| 2004/0015831 A1 | 1/2004 | Bowhill |
| 2004/0015957 A1 | 1/2004 | Zara et al. |
| 2004/0019876 A1 | 1/2004 | Dravida et al. |
| 2004/0024984 A1 | 2/2004 | Lanzatella et al. |
| 2004/0044643 A1 | 3/2004 | deVries et al. |
| 2004/0044998 A1 | 3/2004 | Wildhagen et al. |
| 2004/0054789 A1 | 3/2004 | Breh et al. |
| 2004/0059703 A1 | 3/2004 | Chappell et al. |
| 2004/0064501 A1 | 4/2004 | Jan et al. |
| 2004/0128375 A1 | 7/2004 | Rockwell |
| 2004/0143664 A1 | 7/2004 | Usa et al. |
| 2004/0153703 A1 | 8/2004 | Vigue et al. |
| 2004/0167975 A1 | 8/2004 | Hwang et al. |
| 2004/0193953 A1 | 9/2004 | Callahan et al. |
| 2004/0210893 A1 | 10/2004 | Chamberlain et al. |
| 2004/0215755 A1 | 10/2004 | O'Neill |
| 2004/0215768 A1* | 10/2004 | Oulu et al. .................... 709/224 |
| 2004/0223469 A1 | 11/2004 | Bahl et al. |
| 2004/0250249 A1* | 12/2004 | Fukunari ............ G06F 11/0715 718/100 |
| 2005/0028025 A1 | 2/2005 | Zalewski et al. |
| 2005/0044541 A1 | 2/2005 | Parthasarathy et al. |
| 2005/0044546 A1 | 2/2005 | Niebling et al. |
| 2005/0050175 A1 | 3/2005 | Fong et al. |
| 2005/0086640 A1* | 4/2005 | Kolehmainen ......... G06F 9/445 717/120 |
| 2005/0114474 A1 | 5/2005 | Anderson et al. |
| 2005/0114502 A1* | 5/2005 | Raden ................ G06F 11/3006 709/224 |
| 2005/0125513 A1 | 6/2005 | Sin-Ling Lam et al. |
| 2005/0125525 A1 | 6/2005 | Zhou et al. |
| 2005/0177829 A1 | 8/2005 | Vishwanath |
| 2005/0182796 A1 | 8/2005 | Chu et al. |
| 2005/0198629 A1* | 9/2005 | Vishwanath .................. 717/174 |
| 2005/0223374 A1 | 10/2005 | Wishart et al. |
| 2005/0273779 A1 | 12/2005 | Cheng et al. |
| 2006/0010440 A1* | 1/2006 | Anderson et al. ................. 718/1 |
| 2006/0025985 A1* | 2/2006 | Vinberg et al. ................. 703/22 |
| 2006/0041767 A1 | 2/2006 | Maxwell et al. |
| 2006/0041881 A1 | 2/2006 | Adkasthala |
| 2006/0059493 A1* | 3/2006 | Liesen ................... G06F 9/445 718/105 |
| 2006/0080659 A1 | 4/2006 | Ganji |
| 2006/0095230 A1 | 5/2006 | Grier et al. |
| 2006/0095702 A1 | 5/2006 | Hickman et al. |
| 2006/0101451 A1 | 5/2006 | Fong |
| 2006/0143359 A1* | 6/2006 | Dostert .................. G06F 9/544 711/6 |
| 2006/0143608 A1* | 6/2006 | Dostert ................ G06F 9/5027 718/1 |
| 2006/0146991 A1 | 7/2006 | Thompson et al. |
| 2006/0155735 A1 | 7/2006 | Traut et al. |
| 2006/0155857 A1 | 7/2006 | Feenan et al. |
| 2006/0173912 A1 | 8/2006 | Lindvall et al. |
| 2006/0174018 A1 | 8/2006 | Zhu et al. |
| 2006/0190575 A1 | 8/2006 | Harvey et al. |
| 2006/0190773 A1 | 8/2006 | Rao et al. |
| 2006/0200658 A1 | 9/2006 | Penkethman |
| 2006/0215575 A1 | 9/2006 | Horton et al. |
| 2006/0218544 A1 | 9/2006 | Chakraborty et al. |
| 2006/0218547 A1 | 9/2006 | Purkeypile et al. |
| 2006/0230165 A1* | 10/2006 | Zimmer et al. ................ 709/230 |
| 2006/0236228 A1 | 10/2006 | Michelstein et al. |
| 2006/0282479 A1 | 12/2006 | Johnson et al. |
| 2006/0282567 A1* | 12/2006 | Bhesania ............ G06F 11/3055 710/52 |
| 2007/0011300 A1* | 1/2007 | Hollebeek ........... G06F 11/0715 709/224 |
| 2007/0015538 A1 | 1/2007 | Wang |
| 2007/0053513 A1 | 3/2007 | Hoffberg |
| 2007/0067419 A1 | 3/2007 | Bennett |
| 2007/0101118 A1 | 5/2007 | Raghunath et al. |

(56) References Cited

U.S. PATENT DOCUMENTS

| | | |
|---|---|---|
| 2007/0108627 A1 | 5/2007 | Kozaka et al. |
| 2007/0118654 A1 | 5/2007 | Jamkhedkar et al. |
| 2007/0159650 A1 | 7/2007 | Takamatsu et al. |
| 2007/0168721 A1 | 7/2007 | Luiro et al. |
| 2007/0169079 A1 | 7/2007 | Keller et al. |
| 2007/0169093 A1 | 7/2007 | Logan et al. |
| 2007/0192158 A1 | 8/2007 | Kim |
| 2007/0198755 A1* | 8/2007 | Honda .................. G06F 3/1207 710/36 |
| 2007/0204338 A1 | 8/2007 | Aiello et al. |
| 2007/0226810 A1 | 9/2007 | Hotti |
| 2007/0244996 A1 | 10/2007 | Ahmed et al. |
| 2007/0245332 A1 | 10/2007 | Tal et al. |
| 2007/0250672 A1 | 10/2007 | Stroberger et al. |
| 2007/0250813 A1* | 10/2007 | Sanghvi ................. G06Q 10/06 717/121 |
| 2007/0276905 A1 | 11/2007 | Durand et al. |
| 2007/0288612 A1 | 12/2007 | Hall |
| 2007/0294314 A1 | 12/2007 | Padovano et al. |
| 2007/0294376 A1 | 12/2007 | Ayachitula et al. |
| 2007/0299951 A1 | 12/2007 | Krithivas |
| 2008/0004904 A1 | 1/2008 | Tran |
| 2008/0022271 A1 | 1/2008 | D'Angelo et al. |
| 2008/0028048 A1 | 1/2008 | Shekar CS et al. |
| 2008/0034364 A1 | 2/2008 | Lam et al. |
| 2008/0040452 A1 | 2/2008 | Rao et al. |
| 2008/0046708 A1 | 2/2008 | Fitzgerald et al. |
| 2008/0052384 A1 | 2/2008 | Marl et al. |
| 2008/0059959 A1 | 3/2008 | Chen et al. |
| 2008/0077605 A1 | 3/2008 | Vasu |
| 2008/0082977 A1* | 4/2008 | Araujo et al. ..................... 718/1 |
| 2008/0086728 A1 | 4/2008 | Lam et al. |
| 2008/0104393 A1 | 5/2008 | Glasser et al. |
| 2008/0109876 A1 | 5/2008 | Hitomi et al. |
| 2008/0130639 A1 | 6/2008 | Costa-Requena et al. |
| 2008/0178144 A1 | 7/2008 | Bazigos et al. |
| 2008/0184024 A1* | 7/2008 | Nicklaus ................ G06F 9/46 713/2 |
| 2008/0189693 A1 | 8/2008 | Pathak |
| 2008/0196043 A1 | 8/2008 | Feinleib et al. |
| 2008/0201709 A1* | 8/2008 | Hodges ............... G06F 9/45537 718/1 |
| 2008/0209016 A1* | 8/2008 | Karve et al. ................... 709/221 |
| 2008/0235266 A1 | 9/2008 | Huang et al. |
| 2008/0235361 A1 | 9/2008 | Crosbie et al. |
| 2008/0244325 A1 | 10/2008 | Tyulenev |
| 2008/0263258 A1 | 10/2008 | Allwell et al. |
| 2008/0270674 A1 | 10/2008 | Ginzton |
| 2008/0276262 A1* | 11/2008 | Munshi .................... G06F 8/41 719/328 |
| 2008/0294777 A1 | 11/2008 | Karve et al. |
| 2008/0301231 A1* | 12/2008 | Mehta et al. .................. 709/204 |
| 2008/0301666 A1 | 12/2008 | Gordon et al. |
| 2008/0307259 A1* | 12/2008 | Vasudevan .......... G06F 11/0712 714/23 |
| 2008/0313716 A1 | 12/2008 | Park |
| 2008/0320110 A1 | 12/2008 | Pathak |
| 2009/0007091 A1* | 1/2009 | Appiah et al. ................ 717/171 |
| 2009/0024994 A1* | 1/2009 | Kannan ............... G06F 9/45533 718/1 |
| 2009/0031307 A1* | 1/2009 | Chodroff et al. ............. 718/100 |
| 2009/0037551 A1* | 2/2009 | Gupta ................. G06F 9/45512 709/208 |
| 2009/0044187 A1* | 2/2009 | Smith ...................... G06F 21/57 718/1 |
| 2009/0055901 A1 | 2/2009 | Kumar et al. |
| 2009/0064086 A1 | 3/2009 | Faus et al. |
| 2009/0064132 A1 | 3/2009 | Suchy et al. |
| 2009/0070462 A1* | 3/2009 | Chong et al. .................. 709/224 |
| 2009/0083734 A1 | 3/2009 | Hotra |
| 2009/0089567 A1 | 4/2009 | Boland et al. |
| 2009/0089852 A1 | 4/2009 | Randolph et al. |
| 2009/0103722 A1 | 4/2009 | Anderson et al. |
| 2009/0106291 A1 | 4/2009 | Ku et al. |
| 2009/0129597 A1 | 5/2009 | Zimmer et al. |
| 2009/0132682 A1 | 5/2009 | Counterman |
| 2009/0132710 A1 | 5/2009 | Pelley |
| 2009/0158148 A1 | 6/2009 | Vellanki et al. |
| 2009/0158272 A1 | 6/2009 | El-Assir et al. |
| 2009/0164522 A1 | 6/2009 | Fahey |
| 2009/0165099 A1 | 6/2009 | Eldar et al. |
| 2009/0172430 A1 | 7/2009 | Takenouchi |
| 2009/0210869 A1 | 8/2009 | Gebhart et al. |
| 2009/0217244 A1 | 8/2009 | Bozak et al. |
| 2009/0217255 A1 | 8/2009 | Troan |
| 2009/0222805 A1 | 9/2009 | Faus et al. |
| 2009/0240835 A1 | 9/2009 | Adelman et al. |
| 2009/0241190 A1* | 9/2009 | Todd ...................... G06F 21/53 726/23 |
| 2009/0249488 A1 | 10/2009 | Robinson et al. |
| 2009/0259665 A1 | 10/2009 | Howe et al. |
| 2009/0265707 A1 | 10/2009 | Goodman et al. |
| 2009/0265756 A1 | 10/2009 | Zhang et al. |
| 2009/0282404 A1 | 11/2009 | Khandekar et al. |
| 2009/0285199 A1 | 11/2009 | Strahs et al. |
| 2009/0300164 A1 | 12/2009 | Boggs et al. |
| 2009/0300593 A1 | 12/2009 | Faus et al. |
| 2009/0300601 A1 | 12/2009 | Faus et al. |
| 2009/0319848 A1* | 12/2009 | Thaper ......................... 714/748 |
| 2010/0023740 A1 | 1/2010 | Moon et al. |
| 2010/0049736 A1 | 2/2010 | Rolls et al. |
| 2010/0088699 A1* | 4/2010 | Sasaki .............................. 718/1 |
| 2010/0100876 A1 | 4/2010 | Glover et al. |
| 2010/0131948 A1 | 5/2010 | Ferris |
| 2010/0217837 A1 | 8/2010 | Ansari et al. |
| 2010/0220584 A1 | 9/2010 | DeHaan et al. |
| 2010/0223504 A1 | 9/2010 | DeHaan et al. |
| 2010/0223608 A1 | 9/2010 | DeHaan et al. |
| 2010/0223609 A1 | 9/2010 | DeHaan et al. |
| 2010/0306773 A1 | 12/2010 | Lee et al. |
| 2011/0035733 A1 | 2/2011 | Horning et al. |
| 2011/0153697 A1 | 6/2011 | Nickolov et al. |
| 2011/0170837 A1 | 7/2011 | Barnes, Jr. |
| 2012/0131195 A1 | 5/2012 | Morgan |

OTHER PUBLICATIONS

Heiko Lugwig, Cremona: An Architecture and Library for Creation and Monitoring of WS-Agreements, 2004, pp. 1-9.*

G. Pruett, BladeCenter systems management software, 2005, pp. 963-973.*

Michael DeHaan, "Methods and Systems for Provisioning Software", U.S. Appl. No. 11/763,315, filed Jun. 14, 2007.

Michael DeHaan, "Methods and Systems for Provisioning Software", U.S. Appl. No. 11/763,333, filed Jun. 14, 2007.

DeHaan, "Systems and Methods for Message-Based Installation Management Using Message Bus", U.S. Appl. No. 12/495,077, filed Jun. 30, 2009.

Henson, "Systems and Methods for Integrating Storage Resources from Storage Area Network in Machine Provisioning Platform", U.S. Appl. No. 12/628,041, filed Nov. 30, 2009.

Henson, "Systems and Methods for Mounting Specified Storage Resources from Storage Area Network in Machine Provisioning Platform", U.S. Appl. No. 12/627,988, filed Nov. 30, 2009.

DeHaan, "Systems and Methods for Providing Configuration Management Services from a Provisioning Server", U.S. Appl. No. 12/414,941, filed Mar. 31, 2009.

DeHann, "Systems and Methods for Retiring Target Machines by a Provisioning Server", U.S. Appl. No. 12/475,427, filed May 29, 2009.

DeHaan, "Methods and Systems for Centrally Managing Multiple Provisioning Servers", U.S. Appl. No. 12/201,193, filed Aug. 29, 2008.

DeHaan, "Methods and Systems for Assigning Provisioning Servers in a Software Provisioning Environment", U.S. Appl. No. 12/201,646, filed Aug. 29, 2008.

DeHaan, "Methods and Systems for Providing Remote Software Provisioning to Machines", U.S. Appl. No. 12/195,633, filed Aug. 21, 2008.

(56) References Cited

OTHER PUBLICATIONS

DeHaan, "Systems and Methods for Storage Allocation in Provisioning of Virtual Machines", U.S. Appl. No. 12/202,178, filed Aug. 29, 2008.

DeHaan, "Methods and Systems for Providing Customized Actions Related to Software Provisioning", U.S. Appl. No. 12/200,562, filed Aug. 28, 2008.

DeHaan, "Methods and Systems for Automatically Locating a Provisioning Server", U.S. Appl. No. 12/108,290, filed Aug. 26, 2008.

DeHaan, "Methods and Systems for Managing Access in a Software Provisioning Environment", U.S. Appl. No. 12/201,832, filed Aug. 29, 2008.

DeHaan et al., "Methods and Systems for Importing Software Distributions in a Software Provisioning Environment", U.S. Appl. No. 12/200,631, filed Aug. 28, 2008.

DeHaan, "Methods and Systems for Managing Network Connections Associated with Provisioning Objects in a Software Provisioning Environment", U.S. Appl. No. 12/239,690, filed Sep. 26, 2008.

DeHaan, "Systems and Methods for Software Provisioning in Multiple Network Configuration Environment", U.S. Appl. No. 12/202,194, filed Aug. 29, 2008.

DeHaan, "Systems and Methods for Differential Software Provisioning on Virtual Machines Having Different Configurations", U.S. Appl. No. 12/202,019, filed Aug. 29, 2008.

DeHaan, "Methods and Systems for Automatically Registering New Machines in a Software Provisioning Environment", U.S. Appl. No. 12/194,754, filed Aug. 20, 2008.

DeHaan, "Systems and Methods for Software Provisioning Machines Having Virutal Storage Resources", U.S. Appl. No. 12/202,189, filed Aug. 29, 2008.

DeHaan, "Methods and Systems for Managing Network Connections in a Software Provisioning Environment", U.S. Appl. No. 12/239,681, filed Sep. 26, 2008.

DeHaan et al., "Methods and Systems for Providing a Rescue Environment in a Software Provisioning Environment", U.S. Appl. No. 12/325,007, filed Nov. 25, 2008.

DeHaan et al., "Methods and Systems for Monitoring Hardware Resources in a Software Provisioning Environment", U.S. Appl. No. 12/325,056, filed Nov. 28, 2008.

DeHaan, "Methods and Systems for Providing Management Services in a Software Provisioning Environment", U.S. Appl. No. 12/277,518, filed Nov. 25, 2008.

DeHaan et al., "Methods and Systems for Providing Hardware Updates in a Software Provisioning Environment", U.S. Appl. No. 12/324,991, filed Nov. 26, 2008.

DeHaan et al., "Methods and Systems for Supporting Multiple Name Servers in a Software Provisioning Environment", U.S. Appl. No. 12/324,572, filed Nov. 26, 2006.

DeHaan et al., "Methods and Systems for Secure Gated Filed Deployment Associated with Provisioning", U.S. Appl. No. 12/398,754, filed Feb. 26, 2009.

DeHaan, "Systems and Methods for Integrating Software Provisioning and Configuration Management", U.S. Appl. No. 12/395,379, filed Feb. 27, 2009.

DeHaan, "Systems and Methods for Abstracting Software Content Management in a Software Provisioning Environment", U.S. Appl. No. 12/395,273, filed Feb. 27, 2009.

DeHaan, "Systems and Methods for Providing a Library of Virtual Images in a Software Provisioning Environment", U.S. Appl. No. 12/395,351, filed Feb. 27, 2009.

DeHaan et al., "Systems and Methods for Inventorying Un-Provisioned Systems in a Software Provisioning Environment", U.S. Appl. No. 12/391,588, filed Feb. 24, 2009.

DeHaan et al., "Systems and Methods for Managing Configurations of Storage Devices in a Software Provisioning Environment", U.S. Appl. No. 12/393,613, filed Feb. 26, 2009.

DeHaan et al., "Systems and Methods for Collecting and Altering Firmware Configurations of Target Machines in a Software Provisioning Environment", U.S. Appl. No. 12/393,319, filed Feb. 26, 2009.

DeHaan et al., "Methods and Systems for Replicating Provisioning Servers in a Software Provisioning Environment", U.S. Appl. No. 12/392,508, filed Feb. 25, 2009.

DeHaan, "Systems and Methods for Cloning Target Machines in a Software Provisioning Environment", U.S. Appl. No. 12/473,014, filed May 27, 2009.

Doc Searls "Linux for Suits", 2005, Specialized System Consultants Inc., vol. 2005.

Grosse, "Repository Mirroring", 1995.

Butt et al., "Automated Installation of Large-Scale Linux Networks", 2000.

Agarwalla, "Automating Provisioning of Complete Software Stack in a Grid Environment", 2004.

Anderson at al., "Technologies for Large-Scale Configuration Management", Dec. 9, 2002.

eBook "Microsoft System Management Server 2003 Administrator's companion", Microsoft Press, c2004, Ch. 13, Patch Management, pp. 471-507.

HP Storage Essentials SRM 6.0 Installation Guide, Jan. 2008, HP. 1 st ed. Part No. T4283-96113. pp. 1-5, 97-136, 219-228.

HP Storage Essentials SRM 6.0 User Guide. Jan. 2008. HP. 1st ed. Part No. T4238-96114. pp. 1-83.

Michael DeHaan. "Untlied Provisioning". 2007.

Michael DeHaan. "Provisioning With Cobbler". 2007.

Tan et al. "A WBEM Basked Disk Array Management Provider". 2005. IEEE. 2005 International Conference on Cyberworlds.

Lovelace et al. Managing Disk Subsystems using IBM TotalStorage Productivity Center, Sep. 2005. IBM. 2nd ed. SG24-7097-01. pp. 1-42.

Liu, Huan; "Rapid Application Configuration in Amazon Cloud using Configurable Virtual Appliances", 2011 ACM, SAC'11 Mar. 21-15, 2011, Taiwan, pp. 147-154; <http://dl.acm.org/citation.cfm?id+1982185.1982221&coll=DL&dl=GUIDE
&CFID=268649706&CFTOKEN=27442775>.

"rBuilder 3.0 and rPath Appliance Platform Provide Revenue Growth and Channel Expansion Opportunities for ISVS", Feb. 12, 2007 rPath, Inc., www.rpath.com/corp/press-releases/2007-news/25-february-12-2007-rbuilder-30 . . . , 2 pages.

White Paper—"Best Practices for Building Virtual Appliances", Nov. 15, 2007, rPath, Inc., www.rpath.com, 8 pages. (What was actually uploaded to EFS was a 6-page document; unable to read the copyright info to see if it says 2008 or 2007. Comparing both documents, they look exactly the same.).

Reimer, Darrell, et al., "Opening Black Boxes: Using Semantic Information to Combat Virtual Machine Image Sprawl," published in VEE'08 Proceedings of the fourth ACM SIGPLAN/SIGOPS international conference on Virtual execution environments, pp. 111-120, ACM New York, NY, USA © 2008, table of contents ISBN:978-1-59593-796-4.

Gerla, Tim, Field Engineer, rPath, Inc. "From Application to Appliance Building Software Appliances with rPath's -Builder," 15 pages, Apr. 14, 2008.

Healey, Matt; White Paper "Virtualizing Support", Mar. 2008, IDC, 9 pages. (White Paper—"rPath Versus Other Software Appliance Approaches", Mar. 2008, rPath, Inc., www.rpath.com, 9 pages.).

Office Action for U.S. Appl. No. 12/324,563 mailed Jun. 18, 2013.
Office Action for U.S. Appl. No. 12/324,563 mailed Mar. 24, 2015.
Office Action for U.S. Appl. No. 12/128,787 mailed Aug. 1, 2011.
Office Action for U.S. Appl. No. 12/128,787 mailed Nov. 22, 2011.
Office Action for U.S. Appl. No. 12/128,787 mailed May 24, 2012.
Office Action for U.S. Appl. No. 12/128,787 mailed Sep. 14, 2012.
Office Action for U.S. Appl. No. 12/128,787 mailed Mar. 24, 2014.
Office Action for U.S. Appl. No. 12/128,787 mailed Sep. 30, 2014.
Advisory Action for U.S. Appl. No. 12/128,787 mailed Jan. 20, 2011.
Advisory Action for U.S. Appl. No. 12/128,787 mailed Dec. 4, 2012.

* cited by examiner

MONITORING SOFTWARE PROVISIONING

FIELD

This invention relates generally to software provisioning.

DESCRIPTION OF THE RELATED ART

Software provisioning is the process of selecting a target machine, such as a server, loading the appropriate software (operating system, device drivers, middleware, and applications), and customizing and configuring the system and the software to make it ready for operation. Software provisioning can entail a variety of tasks, such as creating or changing a boot image, specifying parameters, e.g. IP address, IP gateway, to find associated network and storage resources, and then starting the machine and its newly-loaded software. Typically, a system administrator will perform these tasks using various tools because of the complexity of these tasks. Unfortunately, there is a lack of provisioning control tools that can adequately integrate and automate these tasks.

Typically, once software provisioning processes have begun for a target machine, the system administrator cannot determine if the software provisioning processes are executing properly unless the administrator examines the target machine. Usually, the system administrator will examine the target machine to determine if the process executed properly and if the target machine is functioning properly after the processes are complete. If a software provisioning process stalls or terminates before completion, the administrator or user may unaware of the error. Because the administrator is unaware, the target machine may remain dormant until the administrator realizes that a problem has occurred and restarts the provisioning process. This can waste time if the administrator does not regularly monitor the target machines during the provisioning processes. To cure this, the administrator must actively monitor the provisioning processes which also consumes the administrator's time. Accordingly, it would be desirable to provide a provisioning environment in which a provisioning server can actively monitor target machines during the software provisioning processes.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
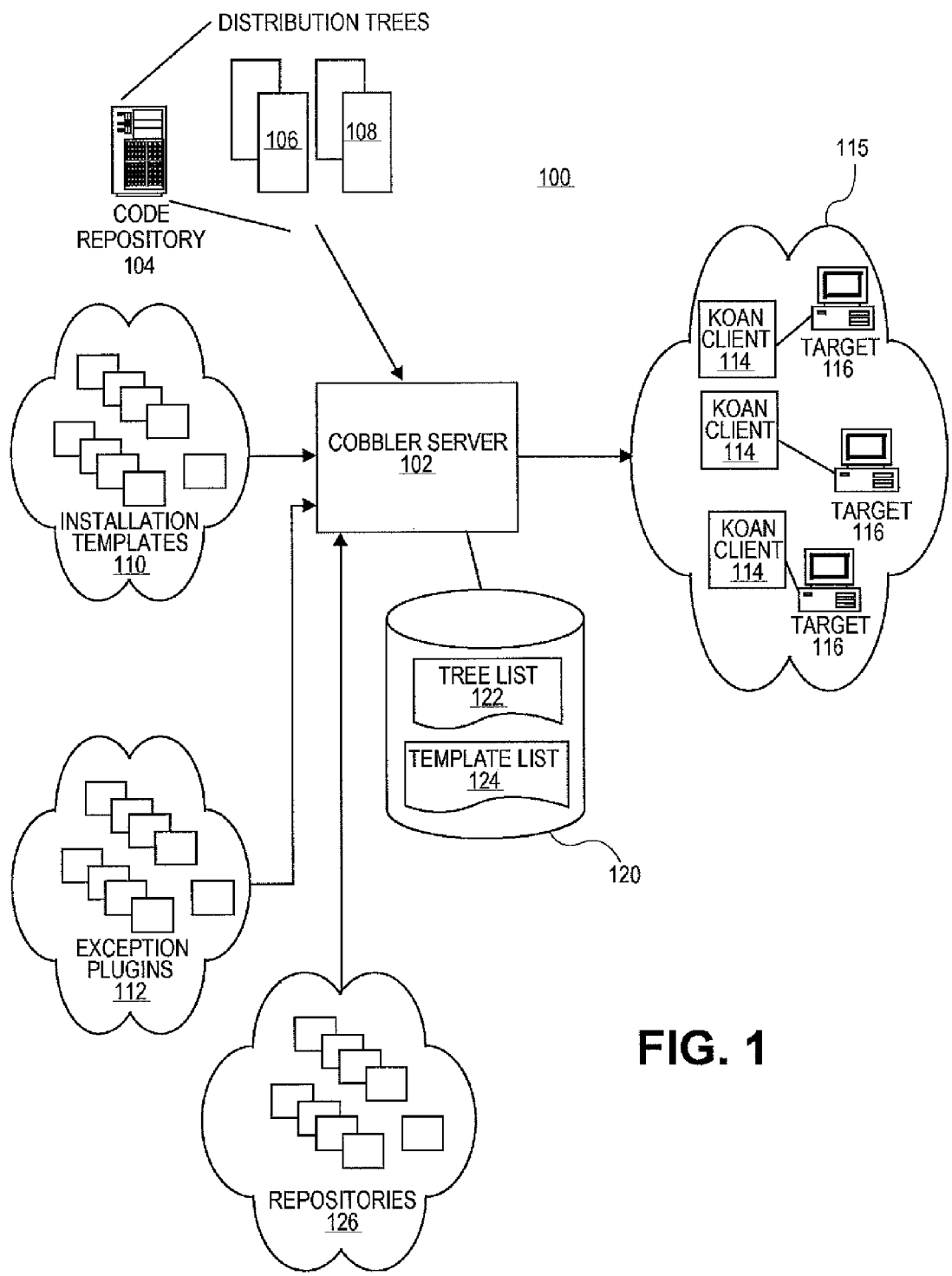
FIG. 1 illustrates an overall provisioning environment in which various embodiments of the present teachings can be practiced.

For simplicity and illustrative purposes, the principles of the present invention are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments of the present teachings relate to systems and methods for actively monitoring software provisioning processes on target machines. More particularly, a provisioning server can actively monitor the software provisioning processes being performed on a target machine to determine the status and integrity of the provisioning processes and notify an administrator or user of the status and integrity.

In embodiments, the provisioning server can be configured to include a monitoring module and a message module. The monitoring module can be configured to monitor software provisioning processes being performed on a target machine and determine the status and integrity of the provisioning processes. The message module can be configured send notification to the administrator or user of the status and integrity of the provisioning processes.

In embodiments, to monitor the provisioning processes, the monitoring module can be configured to receive status messages from a provisioning client assisting the target machine during the software provisioning. Additionally, if a provisioning client is not available, the monitoring module can be to receive the status messages from the target machine or other software instantiated on the target machine, directly. The status messages can include status information about the software provisioning processes. The status information can include the progress of the provisioning processes (amount of the processes completed; specific point reach in the provisioning), the integrity of the processes (still in progress, stalled, terminate early, errors), the completion of the provisioning processes, and the like. The monitoring module can be configured to determine the status and integrity of the provisioning process based on the status information.

In embodiments, the provisioning server can be configured to utilize the status information determined by the monitoring module to generate and update a log file. The log file can include information such as the identification of the target machine, identification of the provisioning processes performed, and status information such as start time of and time of errors or completion of the provisioning processes.

In embodiments, if the monitoring module has determined the provisioning process has stalled, terminated early or completed normally, the provisioning server can be configured to notify an administrator of the provisioning server, administrator of the target machine, and/or user of the target machine. In particular, the message module can be configured generate and send notification to the administrator or user that the a problem has occurred with the provisioning processes or the provisioning processes is completed. Additionally, the message module can be configured to periodically send notification to the administrator or user.

In embodiments, the message module can be configured to generate and send notifications such as an email message, text message, pop-up interfaces for the visual displays associated with the provisioning server and/or target machine, and the like. The notification can include the identification of the target machine, the identification of the provisioning processes, and status information such as start time of the provisioning processes, time of errors or completion of the provisioning processes, description of the errors if any, and the like.

By actively monitoring the provisioning processes, the provisioning server can continuously determine the status and integrity of the provisioning processes. As such, problems with the provisioning processes can be identified as they occur and the administrator can be notified with minimal interaction. Accordingly, the administrator can save time and resources by having access to the current status of provisioning processes and by actively identifying the target machines and processes with problems.

FIG. 1 illustrates an overall provisioning environment 100, in systems and methods for the execution, management, and monitoring of software provisioning, according to exemplary aspects of the present disclosure. Embodiments described herein can be implemented in or supported by the exemplary environment illustrated in FIG. 1. The provisioning environment 100 provides a unified provisioning environment, which comprehensively manages the tasks related to software provisioning.

In particular, the provisioning environment 100 can manage software provisioning using a hierarchy of commands. In exemplary embodiments, the hierarchy can include at least four levels of commands. The lowest level in the hierarchy can comprise distribution commands, which primarily handle base operating system specific tasks of provisioning. The second level can comprise profile commands, which associate a configuration file, such as a kickstart file for Linux or other operating system, with a distribution and optionally allow for customization. The third level comprises system commands, which associate remote systems that are involved with the provisioning of the software. The fourth level comprises repository commands, which address configurations and tasks related to updating the software, remote installation procedures, and optionally customizing the software.

The provisioning environment 100 provides several capabilities and advantages over the known provisioning solutions. For example, the present invention is capable of handling a variety of forms of installations, such as preboot execution environment ("PXE"), virtualization, re-installations, and image installations.

In exemplary aspects, the provisioning environment 100 enables integrating virtualization into a PXE provisioning infrastructure and provides several options to reinstall running machines as well. The provisioning environment 100 can integrate mirroring of package repositories with the provisioning process, so that a provisioning server may serve as a central mirror point of contract for all of an organization's software needs. In aspects, a set of remote mirrored repositories can automatically be used by provisioned systems without additional setup.

Reference will now be made in detail to the exemplary aspects the provisioning environment 100. The provisioning environment 100 can be applied to provisioning any form of software, such as Windows systems, UNIX systems, and Linux systems. In the exemplary description that follows, FIG. 1 is presented to explain the provisioning environment 100 for provisioning software, such as Linux, and Linux based software, such as Fedora and Red Hat Enterprise Linux by Red Hat, Inc.

In provisioning of software such as Linux, many system administrators use what is known as the "kickstart" installation method. Kickstart files are files that specify the intended configuration of the software being provisioned. Kickstart files can be kept on a server and can be read by individual computers during the installation. This installation method allows the use a single or relatively few standard kickstart files to install Linux on multiple machines, making it ideal for network and system administrators.

The kickstart file can be a simple text file, containing a list of items, each identified by a keyword. In general, a kickstart file can be edited with any text editor or word processor that can save files as ASCII text. One skilled in the art will recognize that the present invention may be applied to non-kickstart files in software provisioning. For example, configuration files such as AutoYAST Answer files used in Novell SuSe Linux and Sun Solaris Jumpstart files may also be used by the provisioning environment 100.

Typically, a kickstart file can be copied to the boot disk, or made available on the network. The network-based approach is most commonly used, as most kickstart installations for software provisioning, such as Linux systems, tend to be performed via a network using NFS, FTP, or HTTP on networked computers. Administrators also find it desirable that kickstart installations can be performed using a local CD-ROM, or a local hard drive.

Using kickstart files, a system administrator can create a single file containing the parameters that are needed to complete a typical software installation. For example, kickstart files specify parameters related to: language selection; mouse configuration; keyboard selection; boot loader installation; disk partitioning; network configuration; NIS, LDAP, Kerberos, Hesiod, and Samba authentication; firewall configuration; and package selection.

According to exemplary aspects illustrated in FIG. 1, the provisioning environment 100 can include a provisioning server 102, a code repository 104 which provides access to distributions 106 and 108, a set of installation templates 110, a set of exception plugins 112, a helper client 114 running on target machines 116 in a network 115, a provisioning database 120 which comprises a distribution tree list 122 and template list 124. Each of these components will now be further described.

The provisioning server (from herein referred to as a "cobbler") 102 is responsible for: serving as a extensible markup language remote procedure call (XMLRPC) handler; linking to or mirroring install distribution trees and a configuration database; hosting kickstart templates; hosting plugins, generating installation images, and the like. The cobbler server 102 can be implemented as software, such as Python code, installed on a boot server machine and provides a command line interface for configuration of the boot server. In addition, the cobbler server 102 can make itself available as a Python application programming interface (API) for use by higher level management software (not shown). The cobbler server 102 supports provisioning via PXE, image (ISO) installation, virualization, re-provisioning. As will be described later, the last two modes are performed with the assistance of a helper client 114.

The code repository 104 is responsible for hosting distributions 106 and 108. The code repository 104 may be implemented using well known components of hardware and software. Additionally, the code repository 104 can be include one or more repositories hosting distributions. The distributions 106 and 108 can include bundles of software that is already compiled and configured. The distributions 106 and 108 may be in the form of either rpm, deb, tgz, msi, exe formats, and the like. For example, as Linux distributions, the distributions 106 and 108 are bundles of software that comprise the Linux kernel, the non-kernel parts of the operating system, and assorted other software. The distributions 106 and 108 can take a variety of forms, from fully-featured desktop and server operating systems to minimal environments.

In exemplary aspects, the installation templates 110 are any data structure or processing element that can be combined with a set of installation configurations and processed to produce a resulting configuration file, such as a kickstart file.

In exemplary aspects, exception plugins 112 is software that interacts with cobbler server 102 to customize the provisioning of software. In general, the exceptions plugins 112 are intended to address infrequent customization needs.

In exemplary aspects, the helper client (known as "koan", which stands for "kickstart-over-a-network") 114 can assist the cobbler server 102 during the provisioning processes. The koan 114 can allow for both network provisioning of new virtualized guests and destructive provisioning of any existing system. When invoked, the koan 114 can request profile information from a remote boot server that has been configured with the cobbler server 102. In some aspects, what the koan 114 does with the profile data depends on whether it was invoked with —virt or —replace-self.

In exemplary aspects, the koan 114 can enable replacing running systems as well as installing virtualized profiles. The koan 114 can also be pushed out to systems automatically from the boot server. In some aspects, the koan client 114 is also written in Python code to accommodate a variety of operating systems, machine architectures, etc.

In exemplary aspects, the network 115 can include a number of the target machines 116. The target machines 116 can represent the particular machines to which software provisioning is directed. The target machines 116 may represent a wide variety of computing devices, such as personal computers, servers, laptop computers, personal mobile devices, and the like. In some aspects, the target machines 116 can represent distributed computing environments such as cloud computing environments. Although FIG. 1 shows several of the target machines 116, the provisioning environment 100 can be capable of managing a wide range environments, such as datacenters with thousands of machines or server pools with just a few machines. Additionally, the cobbler server 102 can be connected to multiple networks 115.

In exemplary aspects, the provisioning database 120 can serve as a data storage location for holding data used by the cobbler server 102. For example, as shown, the provisioning database 120 can comprise the distribution tree list 122 and the template list 124. The distribution tree list 122 can provide an inventory of the distributions 106 and 108 that are hosted or mirrored by the cobbler server 102. The template list 124 can provide an inventory of the templates 110 that are hosted by the cobbler server 102.

As noted above, the cobbler server 102 can manage provisioning using a hierarchical concept of distribution commands, profile commands, system commands, and repository commands. This framework enables the cobbler server 102 to abstract the differences between multiple provisioning types (installation, reinstallation, and virtualization) and allows installation of all three from a common platform. This hierarchy of commands also permits the cobbler server 102 to integrate software repositories 126 with the provisioning process, thus allowing systems to be configured as a mirror for software updates and third party content as well as distribution content.

Distributions can contain information about base operating system tasks, such as what kernel and initial ramdisk ("initrd") are used in the provisioning, along with other information, such as required kernel parameters. Profiles associate one of the distributions 106 and 108 with a kickstart file and optionally customize it further, for example, using plugins 112. Systems commands associate a hostname, IP, or MAC with a distribution and optionally customize the profile further. Repositories contain update information, such as yum mirror information that the cobbler server 102 uses to mirror repository 104. The cobbler server 102 can also manage (generate) DHCP configuration files using the templates 110.

In exemplary aspects, the cobbler server 102 can use a provisioning environment that is fully templated, allowing for kickstarts and PXE files to be customized by the user. The cobbler server 102 uses the concept of "profiles" as an intermediate step between the operating system and the installed system. A profile is a description of what a system does rather than the software to be installed. For instance, a profile might describe a virtual web server with X amount of RAM, Y amounts of disk space, running a Linux distribution Z, and with an answer file W.

In exemplary aspects, the cobbler server 102 can provide a command line interface to configure a boot server in which it is installed. For example, the format of the cobbler server 102 commands can be generally in the format of: cobbler command [subcommand] [-arg 1=] [-arg2=]. Thus, a user can specify various aspects of software provisioning via a single interface, such as a command line interface or other known interface. Examples of exemplary cobbler commands can be found in U.S. patent application Ser. No. 11/763,315 and U.S. patent application Ser. No. 11/763,333, the disclosures of which are incorporated herein, in their entirety, by reference.

According to exemplary aspects, a user can use various commands of the provisioning environment 100 to specify distributions and install trees hosted by the code repository 104, such as a distribution from the distributions 106 or 108. A user can add or import a distribution or import it from installation media or an external network location.

According to exemplary aspects, in order to import a distribution, the cobbler server 102 can auto-add distributions and profiles from remote sources, whether this is an installation media (such as a DVD), an NFS path, or an rsync mirror. When importing a rsync mirror, the cobbler server 102 can try to detect the distribution type and automatically assign kickstarts. By default in some embodiments, the cobbler server can provision by erasing the hard drive, setting up eth0 for DHCP, and using a default password. If this is undesirable, an administrator may edit the kickstart files in /etc/cobbler to do something else or change the kickstart setting after the cobbler server 102 creates the profile.

According to exemplary aspects, a user may map profiles to the distributions and map systems to the profiles using profile commands and systems commands of the provisioning environment 100. A profile associates a distribution to additional specialized options, such as a kickstart automation file. In the cobbler server 102, profiles are the unit of provisioning and at least one profile exists for every distribution to be provisioned. A profile might represent, for instance, a web server or desktop configuration.

According to exemplary aspects, a user can map systems to profiles using system commands. Systems commands can assign a piece of hardware with cobbler server 102 to a profile. Systems can be defined by hostname, Internet Protocol (IP) address, or MAC address. When available, use of the MAC address to assign systems can be preferred.

According to exemplary aspects, the user can map repositories and profiles using repository commands. Repository commands can address configurations and tasks related to updating the software, remote installation procedures, and optionally customizing the software. These repository commands can also specify mirroring of the provisioned software to remote servers. Repository mirroring can allow the cobbler server 102 to mirror not only install the trees 106 and 108, but also optional packages, third party content, and updates. Mirroring can be useful for faster, more up-to-date installations and faster updates, or providing software on restricted networks. The cobbler server 102 can also include other administrative features, such as allowing the user to view their provisioning configuration or information tracking the status of a requested software installation.

According to exemplary aspects, a user can utilize commands to create a provisioning infrastructure from a distribution mirror. Then a default PXE configuration is created, so that by default systems will PXE boot into a fully automated install process for that distribution. The distribution mirror can be a network rsync mirror or a mounted DVD location.

According to exemplary aspects, the administrator uses a local kernel and initrd file (already downloaded), and shows how profiles would be created using two different kickstarts—one for a web server configuration and one for a database server. Then, a machine can be assigned to each profile.

According to exemplary aspects, a repo mirror can be set up for two repositories, and create a profile that will auto install those repository configurations on provisioned systems using that profile.

According to exemplary aspects, in addition to normal provisioning, the cobbler server 102 can support yet another option, called "enchant". Enchant takes a configuration that has already been defined and applies it to a remote system that might not have the remote helper program installed. Users might want to use this command to replace a server that is being repurposed, or when no PXE environment can be created. Thus, the enchant option allows the remote the koan client 114 to be executed remotely from the cobbler server 102.

According to aspects, if the cobbler server 102 is configured to mirror certain repositories, the cobbler server 102 can then be used to associate profiles with those repositories. Systems installed under those profiles can be auto configured to use these repository mirrors in commands and, if supported, these repositories can be leveraged. This can be useful for a large install base, fast installation and upgrades for systems are desired, or software not in a standard repository exists and provisioned systems are desired to know about that repository.

According to exemplary aspects, the cobbler server 102 may also keep track of the status of kickstarting machines. For example, the "cobbler status" will show when the cobbler server 102 thinks a machine started kickstarting and when it last requested a file. This can be a desirable way to track machines that may have gone inactive during kickstarts. The cobbler server 102 can also make a special request in the post section of the kickstart to signal when a machine is finished kickstarting.

According to exemplary aspects, for certain commands, the cobbler server 102 will create new virtualized guests on a machine in accordance to the orders from the cobbler server 102. Once finished, an administrator may use additional commands on the guest or other operations. The cobbler server 102 can automatically name domains based on their MAC addresses. For re-kickstarting, the cobbler server 102 can reprovision the system, deleting any current data and replacing it with the results of a network install.

According to exemplary aspects, the cobbler server 102 can configure boot methods for the provisioning requested by the user. For example, the cobbler server 102 can configure a PXE environment, such as a network card BIOS. Alternatively, the cobbler server 102 can compile and configure information for koan client 104. The cobbler server 102 can also optionally configured DHCP and DNS configuration information.

According to exemplary aspects, the cobbler server 102 can serve the request of the koan client 114. The koan client 114 can acknowledge the service of information of the cobbler server 102 and then can initiate installation of the software being provisioned. Additionally the koan client 114 can either install the requested software, e.g., replace the existing operating system, or install a virtual machine.

Figure 2:
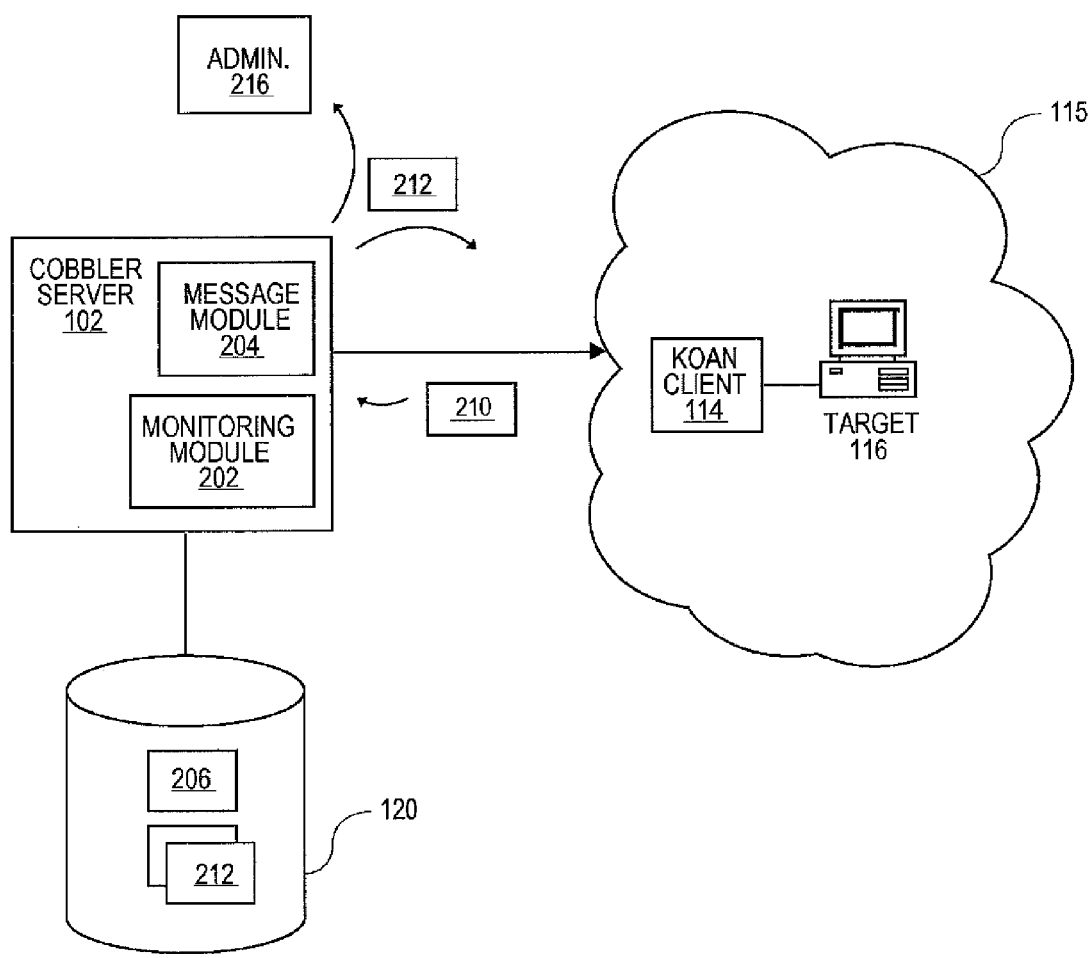
FIG. 2 illustrates the overall provisioning environment in which a provisioning server can actively monitor software provisioning processes, according to various embodiments.

FIG. 2 illustrates aspects of the provisioning environment 100 that allows for monitoring of software provisioning processes occurring on a target machine 116 in the network 115, according to various embodiments. In embodiments as shown, the cobbler server 102 can be configured to include a monitoring module 202 and a message module 204. The monitoring module 202 can be configured to monitor software provisioning processes being performed on the target machine 116 and to determine the status and integrity of the software provisioning processes. The message module 204 can be configured to send notification of the status and integrity of the provisioning processes to an administrator or user of the software provisioning environment 100.

In embodiments, the cobbler server 102, including the monitoring module 202 and the message module 204, can be configured to perform provisioning process as described above. The provisioning processes can be instantiated under the direction of the cobbler server 102, or under the direction of the koan client 114 or target machine 116. To track and determine the software provisioning processes, the cobbler server 102 can be configured to maintain an inventory 206 which can include a list of target machines, a list of provisioning processes performed, completed, and to be performed on each target machine, and specifications of the provisioning process (type of process, start time of process, and software to be provisioned).

In embodiments, to monitor the software provisioning processes, the monitoring module 202 can be configured to receive status messages 210 from the target machines 116 on which provisioning process are being performed. For example, the monitoring module 202 can be configured to receive the status messages 210 from the koan client 114 assisting the target machine 116 during the software provisioning. Additionally, if the koan client 114 is not associated with the target machine 116, the monitoring module 202 can be configured to receive the status messages 210 from the target machine 116 or other other software instantiated (operating systems, installation programs, and the like) on the target machine 116, directly. Once a provisioning process has begun, the koan client 114 or the target machine 116 can be configured to send the status messages 210 at regular intervals during the provisioning process until the processes end or terminates. Likewise, the koan client 114 or the target machine 116 can be configured to send the status messages 210 when particular events are reached or when every event occurs during provisioning process (particular portion completed, particular percentage completed, errors or problems in the provisioning, provisioning completed or terminated).

In embodiments, the monitoring module 202 can be implemented as a portion of the code for the cobbler server 102. Likewise the monitoring module 202 can be implemented as a separate software tool accessible by the cobbler server 102. The monitoring module 202 can be written in a variety of programming languages, such as JAVA, C++, Python code, and the like to accommodate a variety of operating systems, machine architectures, etc. Additionally, the monitoring module 202 can be configured to include the appropriate application programming interfaces ("APIs") to communicate with and cooperate with other components of the cobbler server 102 and the koan clients 114 and target machines 116.

In embodiments, the monitoring module 202 can be configured to receive the status messages 210 from the koan client 114 or the target machine 116 which includes status information. The status information can include the progress of the provisioning processes (amount of the processes completed, events occurring during the provisioning process, portions of the processes complete), the integrity of the processes (still in progress, stalled, terminate early, errors), details of any errors, the completion of the provisioning processes, and the like.

In embodiments, once the status messages 210 are received, the monitoring module 202 can be configured to determine the status and integrity of the software provisioning processes based on the status information. To determine the status, the monitoring module 202 can be configured to parse the status message 210 to extract the status information to determine the status and integrity of the provisioning processes. For example, the monitoring module 202 can examine the status message 210 to determine the progress of the provisioning process, whether the process has stalled or terminated, details of errors, or whether the the provisioning processes have completed.

Additionally, in embodiments, the monitoring module 202 can be configured to compute a likely status and integrity of the provisioning processes. In particular, the monitoring module 202 can be configured to contain logic to interpolate a likely status and integrity. For example, the monitoring module 202 can examine the start time and details of the provisioning processes. If the provisioning processes has been running for a period of time longer than expected, the monitoring module 202 can interpolate that the provisioning processes may be experiencing problems. Likewise, the monitoring module 202 can interpolate the amount of the process completed by comparing the details for the provisioning process to the amount of the processes completed from the status messages 210.

In embodiments, the cobbler server 102 can be configured to utilize the status, determined by the monitoring module 202 from the status messages 210, to generate and update a log 212. In particular, the cobbler server 102 can be configured to generate the log 212 once monitoring begins and update the log 212 each time the monitoring module 202 receives a status message 210 from the target machine 116. The log 212 can include information such as the identification of the target machine, identification of the provisioning processes performed, status information such as start time of and time of errors or completion of the provisioning processes, and details of any errors in the provisioning processes. Additionally, the log 212 can be linked to the inventory 206. The cobbler server 102 can determine the status of the provisioning processes by examining the log 212.

In embodiments, if the monitoring module 202 has determined the provisioning process has stalled, terminated early or completed normally, the cobbler server 102 can be configured to notify, via the message module 204, an administrator 216 of the provisioning server, administrator of the target machine, and/or user of the target machine. In embodiments, the message module 204 can be configured generate and send notification 214 to the administrator 216 and/or user that the a problem has occurred with the provisioning processes or the provisioning processes is completed. Additionally, the message module 204 can be configured to periodically send notification to the administrator 216 and/or user in order to provide a update of the status during the provisioning processes. Additionally, the message module 204 can be configured to send notification on demand to the administrator 216 and/or user in order to provide a update of the status during the provisioning processes. To determine the status for the notification, the cobbler server 102 can be configured to examine the log 212.

In embodiments, in order to notify the administrator 216 and/or the user, the message module 204 can be configured to generate and send the notification 214 in a variety of formats such as an email message, text message, pop-up interfaces for the visual displays associated with the cobbler server 102, the koan client 114, and/or target machine 116, and the like. The notification 214 can include the identification of the target machine, the identification of the provisioning processes, and status information such as start time of the provisioning processes, time of errors or completion of the provisioning processes, description of the errors if any, and the like.

In embodiments, the message module 204 can be implemented as a portion of the code for the cobbler server 102. Likewise, the message module 204 can be implemented as a separate software tool accessible by the cobbler server 102. The message module 204 can be written in a variety of programming languages, such as JAVA, C++, Python code, and the like to accommodate a variety of operating systems, machine architectures, etc. Additionally, the m message module 204 can be configured to include the appropriate APIs to communicate with and cooperate with other components of the cobbler server 102.

Figure 3:
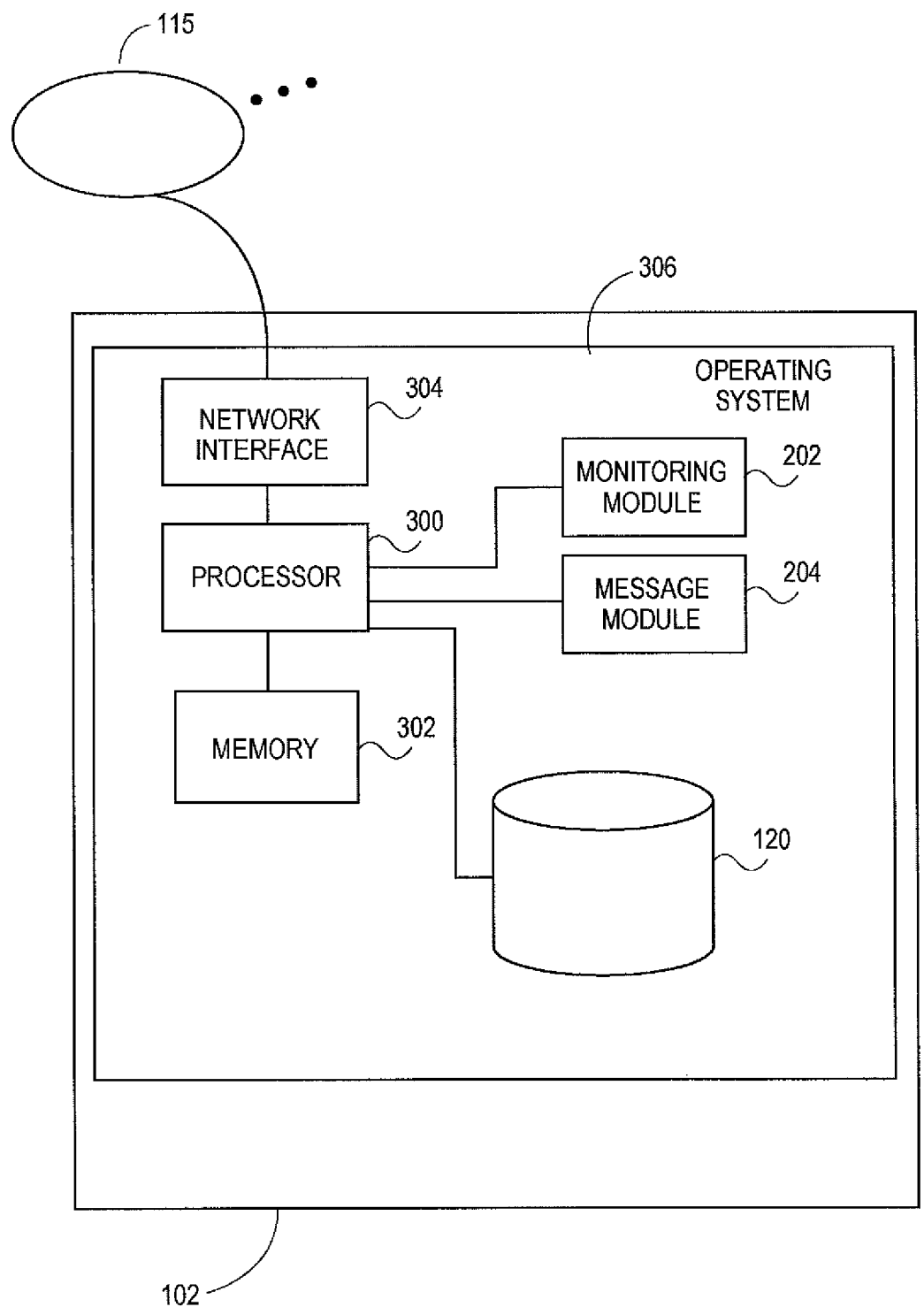
FIG. 3 illustrates an exemplary hardware configuration for a provisioning server, according to various embodiments.

FIG. 3 illustrates an exemplary diagram of hardware and other resources that can be incorporated in the cobbler server 102 configured to communicate with the network 115 and the target machines 116 in network 115, according to embodiments. In embodiments as shown, the cobbler server 102 can comprise a processor 300 communicating with memory 302, such as electronic random access memory, operating under control of or in conjunction with operating system 306. Operating system 306 can be, for example, a distribution of the Linux™ operating system, Unix™ the operating system, or other open-source or proprietary operating system or platform. Processor 300 also communicates with the provisioning database 120, such as a database stored on a local hard drive. While illustrated as a local database in the cobbler server 102, the provisioning database 120 can be separate from the cobbler server 102 and the cobbler server 102 can be configured to communicate with the remote provisioning database 120.

Processor 300 further communicates with network interface 304, such as an Ethernet or wireless data connection, which in turn communicates with one or more networks 115, such as the Internet or other public or private networks. Processor 300 also communicates with the provisioning database 120, the monitor module 202, and the message module 204, to execute control logic and perform the software provisioning processes and monitoring described above. Other configurations of the cobbler server 102, associated network connections, and other hardware and software resources are possible.

While FIG. 3 illustrates the cobbler server 102 as a standalone system comprising a combination of hardware and software, the cobbler server 102 can also be implemented as a software application or program capable of being executed by a convention computer platform. Likewise, the cobbler server 102 can also be implemented as a software module or program module capable of being incorporated in other software applications and programs. In either case, the cobbler server 102 can be implemented in any type of conventional proprietary or open-source computer language.

Figure 4:
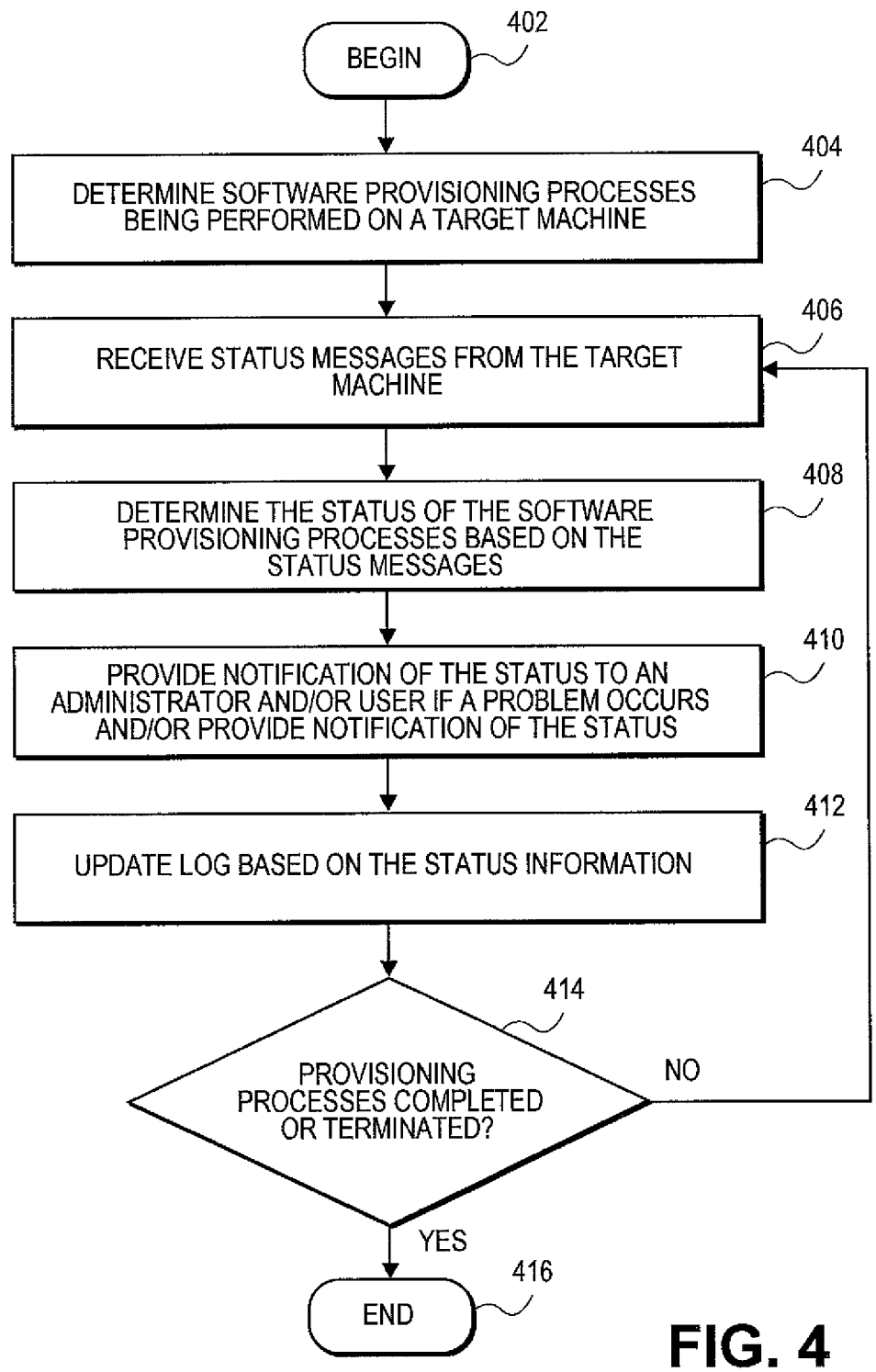
FIG. 4 illustrates a flowchart for monitoring software provisioning processes, according to various embodiments.

FIG. 4 illustrates a flow diagram of overall monitoring of provisioning processes in the provisioning environment 100, according to embodiments of the present teachings. In 402, the process can begin. In 404, the cobbler server 102 can determine software provisioning processes being performed on a target machine. For example, the cobbler server 102 can search the inventory 206 to locate provisioning processes that may need monitoring.

In 406, the cobbler server 102 can receive status messages 210 from the target machine 116. For example, the status messages 210 can include status information such as the progress of the provisioning processes (amount of the processes completed, events occurring during the provisioning process, portions of the processes complete), the integrity of the processes (still in progress, stalled, terminate early, errors), details of any errors, the completion of the provisioning processes, and the like. The koan client 114 or the target machine 116 can send the status messages 210 at regular intervals during the provisioning process until the processes end or terminates. Likewise, the koan client 114 or the target machine 116 can send the status messages 210 when particular events are reached or when every event occurs during provisioning process (particular portion completed, particular percentage completed, errors or problems in the provisioning, provisioning completed or terminated).

Once received, in 408, the cobbler server 102 can determine the status of the software provisioning processes based on the status information. For example, the monitoring module 202 can parse the status messages to determine the status and integrity of the provisioning processes. Additionally, the monitoring module 202 can compute a likely status and integrity of the provisioning processes from the status messages.

Then, in 410, the cobbler server 102 can provide notification of the status to an administrator and/or user if a problem occurs and/or provide notification of the status. For example, the message module 204 can generate and send notification to the administrator and/or user that the a problem has occurred with the provisioning processes or the provisioning processes is completed. Additionally, the message module 204 can periodically send notification to the administrator and/or user in order to provide a update of the status during the provisioning processes. Additionally, the message module 204 can send notification on demand to the administrator and/or user in order to provide a update of the status during the provisioning processes.

Then, in 412, the cobbler server 102 can update a log based on the status information. In 414, the cobbler server 102 can continue to receive the status messages 210 from the target machine 116 to determine the status. In 416, the process can end, but the process can return to any point and repeat.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A computer-implemented method comprising:
providing configuration information from a provisioning server over a network to a plurality of virtual machines at one or more target machines, wherein the configuration information comprises a task for a provisioning process that provisions software on the plurality of virtual machines;
causing the task from the configuration information to be performed during the provisioning process for a virtual machine among the plurality of virtual machines;
receiving a status message at the provisioning server from the virtual machine over the network, wherein the status message indicates an occurrence of an event within the virtual machine during the provisioning process, wherein the event comprises an error that causes the provisioning process to stall or terminate before completion of the provisioning process, and wherein the status message comprises details of the error;
parsing, by a processor at the provisioning server, the details of the error to extract a status of the provisioning process within the virtual machine, wherein the status indicates the error in the provisioning process within the virtual machine; and
generating a notification message to notify a user of the status of the provisioning process within the virtual machine, wherein the notification message is generated at determined intervals during the provisioning process within the virtual machine.

2. The computer-implemented method of claim 1 further comprising computing a possible status from status information of the virtual machine.

3. The computer-implemented method of claim 1 further comprising transmitting the notification message to the user.

4. The computer-implemented method of claim 1, wherein the notification message is generated in response to the status indicating the error in the provisioning process within the virtual machine.

5. A system comprising:
a network interface to a network; and
a processor at a provisioning server to communicate with the network interface to:
provide configuration information from the provisioning server over the network to a plurality of virtual machines at one or more target machines, wherein the configuration information comprises a task for a provisioning process that provisions software on the plurality of virtual machines,
cause the task from the configuration information to be performed during the provisioning process for a virtual machine among the plurality of virtual machines,
receive a status message from the virtual machine over the network via the network interface, wherein the status message indicates an occurrence of an event within the virtual machine during the provisioning process, wherein the event comprises an error that causes the provisioning process to stall or terminate before completion of the provisioning process, and wherein the status message comprises details of the error, parse the details of the error to extract a status of the provisioning process within the virtual machine, wherein the status indicates the error in the provisioning process within the virtual machine, and generate a notification message to notify a user of the status of the provisioning process within the virtual machine wherein the notification message is generated at determined intervals during the provisioning process within the virtual machine.

6. The system of claim 5, wherein the processor is further to compute a possible status from status information of the virtual machine.

7. The system of claim 5 wherein the processor is further to transmit the notification message to the user.

8. The system of claim 5, wherein the notification message is generated in response to the status indicating the error in the provisioning process within the virtual machine.

9. A non-transitory computer readable medium comprising instructions stored therein that, when executed by a processor, cause the processor to:

provide configuration information from a provisioning server over a network to a plurality of virtual machines at one or more target machines, wherein the configuration information comprises a task for a provisioning process that provisions software on the plurality of virtual machines;

cause the task from the configuration information to be performed during the provisioning process for a virtual machine among the plurality of virtual machines;

receive a status message at the provisioning server from the virtual machine over the network, wherein the status message indicates an occurrence of an event within the virtual machine during the provisioning process, wherein the event comprises an error that causes the provisioning process to stall or terminate before completion of the provisioning process, and wherein the status message comprises details of the error;

parse, by the processor at the provisioning server, the details of the error to extract a status of the provisioning process within the virtual machine, wherein the status indicates the error in the provisioning process within the virtual machine; and generate a notification message to notify a user of the status of the provisioning process within the virtual machine, wherein the notification message is generated at determined intervals during the provisioning process within the virtual machine.

10. The non-transitory computer readable medium of claim 9, wherein the processor is further to compute a possible status from status information of the virtual machine.

11. The non-transitory computer readable medium of claim 9, wherein the processor is further to transmit the notification message to the user.

12. The non-transitory computer readable medium of claim 9, wherein the notification message is generated in response to the status indicating the error in the provisioning process within the virtual machine.

* * * * *